Dec. 17, 1963  N. ATUN  3,114,262
VOLUMETRIC GAGE FOR CONDUCTIVE LIQUIDS
Filed May 15, 1959  2 Sheets-Sheet 1

INVENTOR
NATHAN ATUN
BY
Byerly, Townsend, Watson
& Churchill
ATTORNEYS.

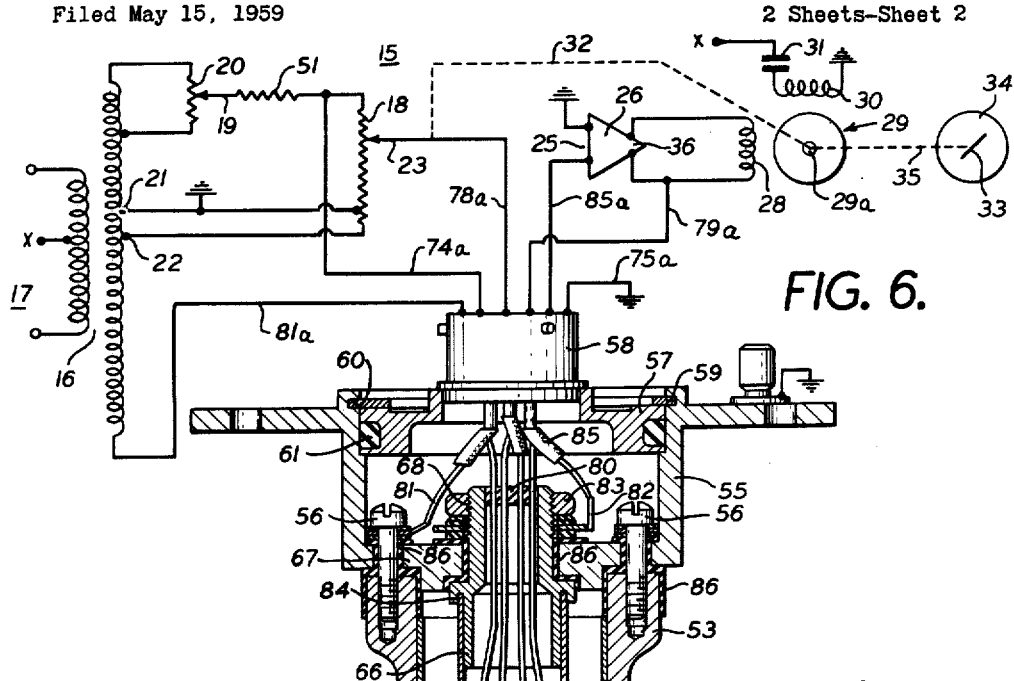

United States Patent Office 3,114,262
Patented Dec. 17, 1963

3,114,262
VOLUMETRIC GAGE FOR CONDUCTIVE LIQUIDS
Nathan Atun, New York, N.Y., assignor to Simmonds Precision Products, Inc., a corporation of New York
Filed May 15, 1959, Ser. No. 813,576
13 Claims. (Cl. 73—304)

This invention relates to volumetric gaging means for measuring a conductive or a lossy dielectric liquid, and in particular, relates to a continuously rebalancing bridge operating on a conductance basis for measuring and indicating the quantity of liquid, such as a hydraulic oil in a hydraulic supply of an aircraft.

In accordance with the current state of the art, rebalancing bridges are adapted to measure liquid material and employ a tank unit constituted by a capacitor measuring device arranged with its electrodes vertically in a liquid filled container. The capacitor electrodes are arranged so that the level of liquid between its electrodes equals the liquid level in the container. The capacitor is designed or otherwise characterized by profiling at least one of its electrodes so that its capacitance is a function of the volume of the liquid in the container as well as the liquid dielectric constant, whereby a bridge measuring signal is furnished in accordance with changes of liquid level. The rebalancing bridge is adapted to compare a reference signal provided by compensating tank components in the bridge with the measuring signal furnished by the measuring capacitor. The resultant signal is proportional to the difference of the two and is amplified to operate a motor-driven bridge balancing device which restores the bridge to balance. The degree of correction required to restore the bridge to balance is an indication of the change of capacitance of the measuring capacitor and is used to indicate the quantity of liquid in the container.

The invention contemplated herein involves a rebalancing bridge operating on a conductance basis and includes a measuring tank unit comprising spaced electrodes supported vertically in the liquid supply. The measuring signal provided by the measuring electrodes is a function of liquid conductivity and the height of liquid in the container. By comparing this signal with a reference signal supplied by another set of tank electrodes always immersed in the liquid, the arrangement is such that the bridge is inherently independent of liquid conductivity. A bridge in accordance with the instant invention offers many advantages over the capacitor gaging bridge. The conductance bridge is adapted to provide accurate volumetric gaging for measuring a conductive or a lossy dielectric liquid. The bridge circuit thereof is much simplified in structure and operation in comparison to the capacitor bridge used for volumetric gaging. Inasmuch as the conductance bridge is inherently independent of the electrical characteristics of the liquid, bridge accuracy is not affected by changes of liquid conductivity, for example contamination of the liquid by reason of use. The conductance bridge does not require empty adjustment calibrations and bridge components therefor as normally required in the capacitor bridge.

It is a principal object of this invention to provide volumetric gaging means for measuring the quantity of a conductive or a lossy dielectric liquid by means of a continuously rebalancing bridge operating on a conductance basis.

It is another object of the invention to provide volumetric bridge gaging means operating on a conductance basis whereby a bridge measuring signal proportional to liquid conductivity and liquid level in the supply is provided by a first set of tank electrodes. A bridge reference signal proportional to liquid conductivity is provided by another set of tank electrodes always immersed in the liquid, which signal is compared to the measuring signal to provide a bridge balancing signal independent of liquid conductivity and based upon the difference of the measuring and the reference signals. The bridge balancing signal is amplified by suitable means to operate a motor-driven rebalancing potentiometer of the bridge circuit to readjust the bridge reference circuit to return the bridge to balance, whereby the amount of return, i.e. adjustment, is a linear indication of a volumetric liquid measurement.

One preferred embodiment of the invention is adapted to gage an aircraft hydraulic oil, known as Skydrol "500" produced by Monsanto Chemical Company. The temperature of this liquid varies as it is used in an aircraft hydraulic system. Consequently, the bridge contemplated herein is designed for sensitive but stable volumetric gaging operation for Skydrol "500" temperatures over a range from about −40° C. to about 107° C. Skydrol has a large negative resistance-temperature coefficient, and between the limits of the above described temperature range its resistivity varies considerably. Although the bridge is inherently insensitive to liquid conductivity, overall bridge operation becomes highly sensitive at the high liquid temperatures because of the high conductance exhibited by the tank units at such temperatures. On the other hand, at extremely low liquid temperatures overall bridge operation tends to become insensitive because of high resistivity exhibited by the tank units at the low temperatures. At high temperatures, bridge sensitivity is evidenced by wiper hunting of the bridge rebalancing potentiometer as it seeks to rebalance the bridge.

Accordingly, it is a further object of this invention to provide means for gaging a conductive or a lossy liquid by the use of a rebalancing bridge operating on a conductance basis and designed, in particular, for stabilized and sensitive volumetric gaging over a wide range of liquid temperatures.

It is a further object of the invention to provide a negative feedback circuit from the output to the input of the previously described bridge amplifying means wherein the feedback signal is a function of the resistivity of the liquid to be measured. The feedback circuit is designed to have a negative resistance-temperature coefficient. At high liquid temperature the feedback signal has the most effect resulting in the smallest gain for the amplifier, at low liquid temperatures the feedback signal has the least effect and the amplifier has the highest gain which renders the bridge operation sensitive and stable over a wide range of liquid temperatures.

It is a further object of this invention to provide a negative feedback circuit from the output to the input of a very high gain amplifier furnishing the bridge balancing signals, which circuit is constituted by an additional set of spaced electrodes extending into the liquid container with the electrodes fully immersed in the liquid. The conductance of the feedback circuit is a function of liquid conductivity such that amplifier gain is suitably regulated to provide relatively sensitive and stable volumetric gaging over a wide range of liquid temperatures.

In volumetric gaging of liquid as contemplated herein, it is desirous that the rebalancing bridge respond to and indicate volume of the liquid under measurement and changes thereof due to drainage, leakage or evaporation. On the other hand, the bridge should be insensitive to any change of liquid volume due solely to changes of liquid temperature. In other words, it would not be desirable to have the bridge indicate changes of liquid level or volume caused by expansion or contraction of the liquid due to an increase or decrease of liquid temperatures.

Accordingly, it is another object of the invention to include a temperature sensing device in the bridge circuit whereby volumetric bridge gaging is essentially insensitive to changes of liquid volume due solely to liquid temperature variations.

As a further object of the invention, the temperature sensing device is constituted by a nickel element immersed at all times in the liquid or otherwise positioned in the tank unit for sensing liquid temperature. Temperature compensation as contemplated herein is adaptable for use in either one of two ways. In one embodiment, the temperature sensing device may be adapted to regulate the voltage drop across the bridge balancing potentiometer in response to liquid temperature variations, whereby bridge measuring signals due to such liquid temperature variations are balanced out by reference signals caused by correlated regulation of potentiometer voltage without requiring readjustment of its wiper. In the second embodiment, the temperature sensing device is adapted to regulate the voltage drop across the tank electrodes furnishing the bridge measuring signal in order to compensate for measuring signals otherwise due solely to liquid temperature variations. The temperature sensing device contemplated herein also provides a further advantage in that it is equally adaptable to a capacitor type of bridge as well as conductance bridge gaging.

It is a further object of the invention to provide an improved tank unit structure which incorporates the measuring electrodes, the compensating electrodes, the feedback electrodes and the temperature sensing element as a unitary device for volumetric gaging a liquid on a conductance basis.

Further objects and advantages will become apparent from the following description of the invention taken in conjunction with the figures, in which:

FIG. 5 depicts the voltage regulation curve for the bridge rebalancing potentiometer furnished by the circuit of FIG. 4;

Figure 4A:
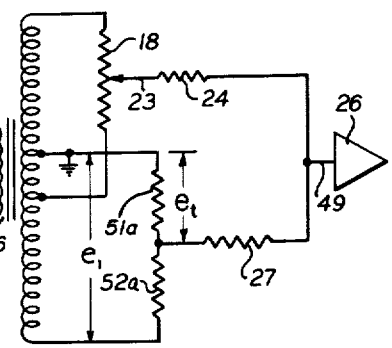
FIG. 4a illustrates schematically an alternative circuit for accomplishing the same purpose shown in FIG. 4.

FIG. 5a depicts a voltage regulation curve furnished by the circuit of FIG. 4a; and FIG. 6 illustrates a preferred embodiment of the tank unit in longitudinal section which unit incorporates the measuring electrodes, compensating electrodes, feedback electrodes and the temperature sensing element as a unitary device; the figure also illustrates schematically the foregoing components electrically coupled to the circuit constituting the rebalancing bridge operating on a conductance basis in accordance with the invention.

Figure 1:
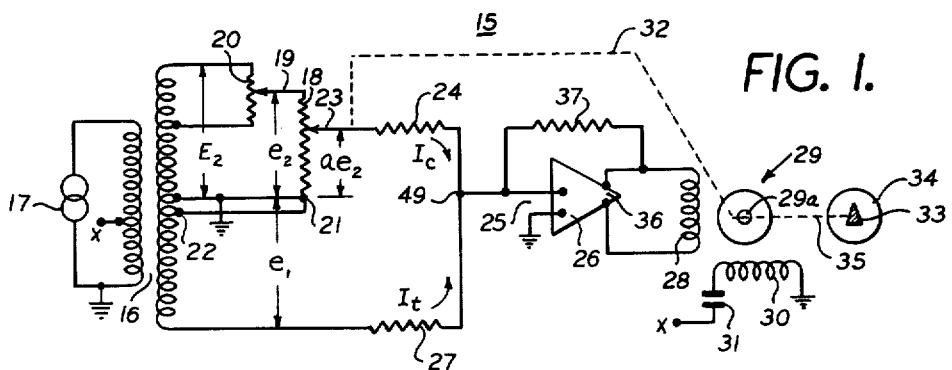
FIG. 1 illustrates a schematic diagram of a rebalancing bridge operating on a conductance basis for volumetric gaging of a conductive or a lossy dielectric liquid in accordance with the practice of the instant invention.

Reference is now made to FIG. 1 for an analysis of a conductance bridge-gage 15 in accordance with the practice of the inventions claimed herein. Bridge 15 is designed for volumetric gaging a liquid 10, such as an aircraft hydraulic oil in the hydraulic supply depicted as a container 11. Bridge 15 includes a transformer 16 having its primary side energized by a source 17, for example 115 volts-400 cycles. The secondary side of transformer 16 is tapped to provide first and second voltage sources $e_1$, $E_2$ of opposite polarity with respect to ground. A bridge balancing potentiometer 18 is energized by one of the aforesaid sources. The actual voltage applied to potentiometer 18 with respect to ground is depicted as $e_2$. This voltage may be varied slightly for the purpose of bridge "full" adjustments by means of a wiper 19 of a potentiometer 20. Potentiometer 20 is conductively coupled to the high potential side of the transformer secondary furnishing voltage $E_2$. The high potential side of rebalancing potentiometer 18 is conductively coupled to wiper 19. Potentiometer 18 has a ground tap 21 and a small portion below ground provided by tap 22 to provide a reversing voltage at its lower portion for reasons to be explained hereinafter. Potentiometer 18 has a movable rebalancing wiper 23 adapted to provide a wiper voltage $ae_2$ with respect to ground corresponding to a proportionate part of voltage $e_2$. A resistor 24 depicts schematically a set of spaced electrodes extending into liquid container 11. The electrodes constituting resistor 24 are completely immersed in liquid 10 at all times during bridge measuring operation, and are conductively coupled to the bridge circuit to provide a path for a bridge compensating current $I_c$ from wiper 23 to the input terminals 25 of an amplifier 26. As it will be seen hereinafter, current $I_c$ is proportional to wiper voltage $ae_2$, whereas the conductance of resistor means 24 is a function of liquid conductivity. A resistor 27 depicts schematically another set of spaced electrodes extending into liquid container 11. Resistor 27 defines current conducting means adapted to receive a level of liquid between its electrodes exactly equal to the height of liquid in container 11. The electrodes constituting resistor 27 are conductively coupled in the bridge circuit to provide a path for a bridge measuring current $I_t$ from the high potential side of source $e_1$ to amplifier input 25. As will be noted hereinafter, the current $I_t$ is proportional to voltage $e_1$, and the conductance of resistor means 27 is a function of liquid conductivity and the amount of liquid 10 in container 11.

In operation, amplifier 26 provides a bridge balancing signal at its output 36 corresponding to a signal based upon the difference between bridge currents $I_t$, $I_c$. The amplified signal is applied to a control winding 28 of a two-phase induction motor shown schematically at 29. Motor 29 has a reference winding 30 energized by source 17. A phase-shifting capacitor 31 is provided in the circuit of winding 30 to impart a desirable phase relationship to the motor winding fields. Motor shaft 29a will turn in either direction depending upon the phase relationship between source 17 and the amplified balancing signal from amplifier 26. Wiper 23 is mechanically linked to motor shaft 29a as depicted by broken line 32, whereby motor shaft turning in one or the other of its two directions will reposition wiper 23 in a direction to change wiper voltage so that bridge current $I_c$ will change to rebalance the bridge in response to an incremental change of bridge current $I_t$ due to an incremental change of liquid level in container 11. When wiper 23 arrives at a new position corresponding to bridge balance, this action reestablishes a zero input to amplifier 26. A movable pointer 33 of a dial indicator 34 is also mechanically responsive to motor shaft turning as depicted by broken line 35. Indicator 34 may be calibrated to indicate directly the quantity of liquid 10 in container 11.

Amplifier 26 is of any suitable design for the purposes contemplated and in preferred embodiment involves a three-stage grounded emitter transistor amplifier providing a very high gain, which amplifier is characterized to provide stabilized operation over a wide range of temperatures and by a low input impedance to avoid loading effects by cable capacitance. Skydrol "500" has a negative resistance-temperature coefficient wherein its resistance varies considerably over the range of temperature experienced by the oil during operation of the aircraft. Consequently, for bridge operation at high liquid temperatures, the conductivity of Skydrol "500" is very high, whereby the conductances of the bridge resistors 24, 27 are proportionately large. This characteristic of the bridge in combination with the high gain provided by amplifier 26 makes the bridge relatively sensitive to incremental changes of measuring current $I_t$ due to a given incremental change of liquid height in container 11 in comparison to bridge operation for relatively low liquid temperatures wherein an incremental change of liquid level of like amount provides a relatively small measuring current $I_t$. Consequently, at high liquid temperatures, wiper 23 tends to hunt as the bridge seeks to rebalance itself. In order to overcome hunting, a negative feedback signal is provided from amplifier output 36 to its input 25. The feedback path is depicted schematically by a resistor 37. Resistor 37 in preferred embodiments consists of another set of spaced electrodes extending into the liquid container. The electrodes defining feedback resistor 37 are fully immersed in the liquid at all times during bridge measuring operation. The 180° phase shift for negative feedback may be provided by one stage of the transistor amplifier. As will be seen hereinafter, the conductance of feedback resistor 37 is proportional to the conductivity of liquid 10. The foregoing arrangement provides a large feedback signal proportional to the bridge balancing signal for high temperature liquid operation for suppressing wiper hunting by damping the input signal to amplifier 26, and, in addition, provides a damped feedback signal for low temperature bridge operation. Thus, it will be understood that the use of feedback conductance 37 permits the amplifier gain to adjust automatically for changes in liquid resistivity to provide stable and sensitive gage operation over the desired range of operating temperatures for the liquid.

Figure 2:
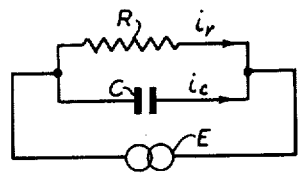
FIG. 2 is an equivalent circuit of a tank unit and is employed herein for an analysis of the invention.

Gaging of any liquid on a volume basis depends upon the relationship of the liquid dielectric constant and its resistivity. Volume gaging as contemplated herein is accomplished if the liquid conductivity is the predominant factor. A parallel plate tank unit immersed in a liquid may be depicted by the equivalent circuit shown in FIG. 2. For operation on a conductance basis, it would be sufficient that the relationship of Equation 1 is satisfied, where $i_r$ is the resistive or real current component and $i_c$ is the capacitive or reactive current component:

$$i_r >> i_c \quad [1]$$

which may be rewritten as Equation 2 in terms of conductance G and capacitance C:

$$|G| >> |2\pi fC| \quad [2]$$

The capacitance of the fully immersed tank unit assuming no dead capacitance and no fringing is:

$$C = .224 \frac{KA}{d} \times 10^{-12} \text{ farads} \quad [3]$$

where A and d, respectively, are the active areas of the plate electrodes and the separation between the plates in inches, and K is the dielectric constant of the intervening fluid. The resistance R of the immersed tank unit is $$R = \rho \frac{d}{A} \text{ohms} \quad [4a]$$

and its conductance is:

$$G = \frac{A}{\rho d} = \sigma \frac{A}{d} \text{mhos} \quad [4b]$$

where $\rho$ and $\sigma$ are, respectively, resistivity and conductivity of the liquid. Applying Equations 3 and 4b to Equation 2, the relationship for conductive operation is as follows:

$$\sigma \frac{A}{d} >> 2\pi f .224 \frac{KA}{d} \times 10^{-12} \quad [5]$$

or as follows where frequency is 400 cycles:

$$\sigma >> 5.62 \times 10^{-10} K \quad [6]$$

For operation on a conductance basis, as noted hereinbefore, the conditions of Equation 1 must be satisfied; and it will be sufficient if the resistive current component $i_r$ is equal to or greater than 10 times the capacitive current component $i_c$. Consequently, Equation 7 is then the governing equation for the application of a liquid to conductance bridge measurements because it will be understood that this equation is also valid for any tank unit configuration:

$$\sigma \geqslant 5.62 \times 10^{-9} K, \text{ or}$$

$$\rho \leqslant \frac{178}{K} 10^6 \quad [7]$$

Skydrol "500" is a fire resistant-hydraulic oil. At room temperature, its dielectric constant is nominally 20 and its resistivity nominally 8 meg-ohm inches for a pure sample of this oil. Applying the foregoing electrical characteristics of Skydrol to Equation 7:

$$\rho \leqslant \frac{178}{20} \times 10^6 = 8.9 \text{ meg-ohm inches} \quad [8]$$

The resistivity of this hydraulic oil is less than 8.9 meg-ohm inches which satisfies the requirement for the application of Skydrol to conductance bridge measurements. As noted hereinbefore, Skydrol has a negative resistance-temperature coefficient; its dielectric constant vs. temperature variations is substantially flat over the temperature range from about $-10°$ C. to $110°$ C. and thus relatively unchanging. At very low temperatures, in the order of $-40°$ C. to about $-60°$ C., the dielectric constant of Skydrol decreases to about a value of 8 whereas its resistivity increases considerably. For temperatures in the order of $-50°$ C., the resistivity of the liquid is very much larger than its dielectric constant. In one working embodiment of bridge 15, a value of two microfarads was used for capacitor 31. This value for capacitor 31 insures bridge operation on a conductance basis rather than a capacitance basis with a slight loss of sensitivity. However, it is not expected that the hydraulic liquid will remain at such low temperatures for any great length of time even if operation is contemplated over a wide range of temperatures including temperatures about $-50°$ C. Thus the loss in bridge sensitivity at this low level of temperature operation will not detract from the effectiveness of gaging the liquid on a straight conductance basis. The foregoing analysis illustrates that Skydrol, or any other liquid of like characteristics, may be gaged on a straight conductance basis.

Figure 3:
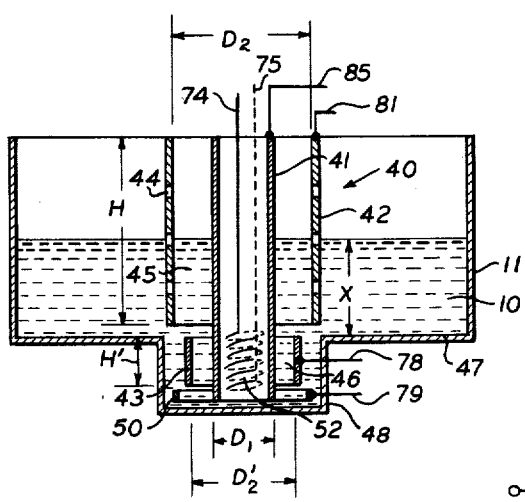
FIG. 3 depicts diagrammatically the principal components of a unitary tank unit made in accordance with the practice of the invention.

FIG. 3 illustrates the basic components of a unitary tank unit 40 constituting the compensating and measuring electrodes in accordance with the practice of the invention. Tank unit 40 involves a hollow inner tubular electrode member 41 and a plurality of hollow, axially spaced outer tubular electrode members 42, 43. Members 42, 43 are supported coaxially about member 41 with member 43 surrounding the lower portion of electrode 41. The inner diameter surface of member 42 and the confronting portion of the outer diameter surface of member 41 constitutes the measuring tank unit, i.e., resistor 27. The inner diameter surface of member 43 and the confronting portion of the outer diameter surface of member 41 constitute the compensating tank unit, i.e., resistor 24. Tank unit 40 is supported vertically in the hydraulic oil container 11. The tubular wall of electrode 42 is provided with through openings 44 to permit a free flow of liquid 10 between the active areas of electrodes 41, 42 so that the level of liquid 10 between electrodes 41, 42, space 45, is always equal to the level of liquid 10 in container 11. The foregoing arrangement also assures that space 46 between the active areas of electrodes 41, 43 is always immersed in liquid 10. The bottom of tank 11 may be considered to be wall 47; and for the purpose of analysis, wall 47 is deemed to be coplanar with the top edge of electrode 43, which edge in a horizontal plane is spaced closely and immediately below the lower edge of electrode 42. Container 11 is recessed at 48 to receive the lower portion of tank unit 40. Space 45 between the active areas of electrodes 41, 42 should be large enough for proper drainage of liquid 10. This is not necessary for the design of the compensator portion of tank 40 because the active areas of the compensator electrodes are always immersed in liquid 10. When container 11 is full, the level of liquid 10 reaches the top edges of electrodes 41, 42. Since the bridge contemplated herein is adapted to gage Skydrol in an aircraft hydraulic system, the tank electrodes and other parts constituting tank 40 are made of material capable of withstanding immersion in this type of liquid and are preferably relatively light in weight. The active areas of all electrodes in tank 40 should be free of insulation. In the working embodiment of the bridge for gaging Skydrol, the tank electrodes are made of metal, such as aluminum. However, for other applications where a metal coated tube can be utilized for the tank electrodes, these electrodes may be made of epoxy impregnated fibre glass tubing with deposits of metal spray, such as silver, to constitute the conductive surfaces thereof. When the tank electrodes are constituted by metal spray on fibre glass tubing, the coating may be deposited on the outer diameter surface of member 41 and the inner diameter surfaces of members 42, 43. The spray may contain a binder in order to keep the conducting coatings mechanically stable. The spray on member 41 is continuous to its lower end so that inner electrode 41 also serves as a common junction 49 (see FIG. 1) for the bridge circuit. In the following description of the tank electrodes, it will be assumed that the electrodes are aluminum tubes.

The physical dimensions of the active areas of electrodes 41, 42, 43 are depicted in FIG. 3 to assist in the following analysis of the conductance bridge; where dimensions $D_1$, $D_2$, $D_2'$, H and H' are in inches and depict, respectively, the outer diameter of electrode 41, the inside diameters of electrodes 42, 43 and the axial lengths of the active areas of the pairs of electrodes.

The general expression for conductance $G_t$ of the measuring tank, resistor 27 is:

$$G_t = \frac{xH2\pi\sigma}{\ln\frac{D_2}{D_1}} \quad [9]$$

where $x$, see FIG. 3, is a fraction of liquid height in container 11 above the compensator electrode 43 and varies between 0 and 1. The expression for the compensator conductance $G_c$ is:

$$G_c = \frac{H'2\pi\sigma}{\ln\frac{D_2'}{D_1}} \quad [10]$$

Hence, the equation for bridge balance may be expressed as follows:

$$I_t = I_c$$
$$e_1 G_t = ae_2 G_c \quad [11]$$
$$\frac{xe_1 H}{\ln\frac{D_2}{D_1}} = \frac{ae_2 H'}{\ln\frac{D_2'}{D_1}}$$

where $a$ is a fraction of wiper voltage above ground and varies between 0 and 1. The last expression of Equation 11 may be used to establish gage response upon determining a value of voltage $e_2$ by calibrating or adjusting the bridge for balance with container 11 full of liquid 10. For this "full adjust" calibration, $x=1$, and wiper 23 is set to its uppermost position, and $a=1$; Equation 11 becomes:

$$e_2 = \frac{e_1 G_{tf}}{G_a} \quad [12]$$

where $G_{tf}$ is the value of full tank conductance for resistor 27. Hence, gage response from Equations 11 and 12 is:

$$x = aF \quad [13]$$

where F is a constant.

In the embodiment of tank unit 40 for Skydrol, one electrode of measuring resistor 27, for example the conductive surface of the outer diameter of member 41, can be characterized or otherwise profiled by being suitably masked in accordance with practices known in the art to provide a height vs. volume relationship duplicating that of liquid 10 in container 11. This will provide a bridge measuring signal and thus a bridge output which is a linear function of the actual volume of liquid in container 11, whereby the gage response becomes a direct volumetric indication of liquid 10 independent of changes of liquid resistivity. The foregoing analysis indicates that the gage response is independent of resistivity of liquid 10 with the result that the position of wiper 23 above ground is a linear function of liquid height in container 11 and thus volume of liquid 10 in the container.

When the container 11 is dry, the conductance of resistor 27 is essentially zero, i.e., an open circuit, which makes $I_t$ zero. This will drive wiper 23 to ground. The inertia of the system may cause wiper 23 to overshoot ground. The lower portion of potentiometer 18 is provided with a small reversing voltage below ground to return wiper 23 to empty position. The foregoing illustrates that gage 15 does not require an empty tank adjustment because at empty, both $x$ and $a$ are zero. Hence, gage 15 eleminates the need of a dry reference component and an empty adjustment potentiometer normally required for volumetric gaging by the capacitive bridge. Further advantages offered by conductive gaging in comparison to capacitive gaging are as follows. Since conductance gaging is inherently independent of liquid resistivity, gage 15 does not require additional bridge compensating components or a transformer as normally used in a capacitive gage when the latter is adapted to provide gage readings independent of liquid dielectric constant. Moreover, since gage 15 is inherently independent of liquid conductivity, liquid contamination and hence changes of its electrical characteristics by reason of use will not introduce scale errors. It will thus be understood that conductance gage 15 is considerably simpler than the comparable capacitor gage.

Although the inherent accuracy of conductance bridge 15 is independent of liquid conductivity, gaging of Skydrol has indicated high rebalancing sensitivity for bridge operation at high liquid temperatures, and a relatively low sensitivity at low liquid temperatures. This is observed when Skydrol is gaged over a wide temperature range from about −60° C. to about 110° C. wherein the resistivity of the liquid varies from almost 2,000 meg-ohm inches at about −60° C. to slightly less than 2 meg-ohm inches at about 110° C. Bridge sensitivity at the high temperatures was evidenced by hunting of wiper 23, in particular, for temperatures above 105° C. As noted hereinbefore, such bridge instability is corrected by a negative feedback circuit characterized by a negative resistance-temperature coefficient and adapted to couple the last stage of amplifier 26 with its first stage as depicted by resistor 37 in FIG. 1. In preferred form, resistor 37 is constituted by spaced electrodes also incorporated in tank 40, FIG. 3. One electrode of the feedback circuit is the lowermost portion of inner conductor 41. The other electrode is a hollow tubular member 50 supported coaxially about electrode 41 at the bottom of tank 40. Electrode 50 is made of aluminum metal. The active areas of the feedback electrodes constituting resistor 37 are always immersed in liquid 10 during bridge measuring operations, therefore, conductance of resistor 37 is a function of liquid resistivity. The foregoing feedback circuit permits amplifier 26 to adjust automatically for changes of liquid resistivity to provide stable and sensitive bridge operation over a full range of normal operating temperatures.

At high temperatures of operation, rebalancing potentiometer 18 may become excessively loaded by compensator resistor 24 due to the high liquid conductivity. This may be corrected by designing the compensating resistor 24 to have a resistance of about 150 times greater than the resistance of potentiometer 18 to keep the loading error at 0.1% for a liquid level of $x=.667$.

Figure 4:
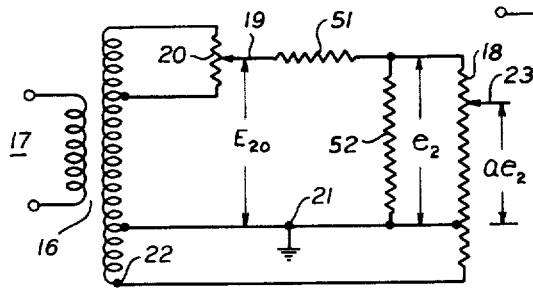
FIG. 4 depicts schematically one circuit embodiment for the temperature sensor, which circuit is adapted to render volumetric bridge gaging independent of liquid volume changes due solely to liquid temperature changes.

Skydrol undergoes a relatively wide temperature variation when used in an aircraft hydraulic supply which causes the liquid to expand or contract in container 11 in accordance with an increase or drop of temperature. In gaging the liquid, it was found that its volume varied about 14% over a range from about $-54°$ C. to $107°$ C. Hence, volumetric measurements of the liquid by conductance gage 15 are adapted to indicate continuously the volume of liquid 10 in container 11 and changes thereto due to drainage, leakage and/or evaporation, but not to volumetric changes due to temperature variations. The circuit of FIG. 4 illustrates a temperature sensing network in the compensating side of the bridge for balancing out measuring currents $I_t$ created by volumetric changes of liquid 10 due solely to temperature variations. The circuit of FIG. 4a illustrates an alternative embodiment of temperature sensing network for accomplishing the same purpose. In FIG. 4a, the sensing means is coupled to the signal measuring side of the bridge.

In FIG. 4, the volume-temperature compensating means involves a fixed resistor 51 and a temperature sensing probe 52. Probe 52 is conductively coupled in shunt relationship across potentiometer 18 with respect to ground. The junction of potentiometer 18 and probe 52 removed from ground is conductively coupled in series with resistor 51. The other side of resistor 51 is connected to wiper 19. Probe 52 is constituted by a nickel wire element immersed or otherwise supported at the bottom of tank 40, see FIG. 3, so that at all times during bridge operation, probe 52 is positioned to sense the temperature of liquid 10. In the illustrated embodiment, the nickel probe 52 is supported at the bottom interior portion of member 41. Nickel material is used for probe 52 because it has a large positive and true linear resistance-temperature coefficient and is adequately sensitive for the purposes contemplated. The expression for potentiometer voltage $e_2$ as determined by the compensating network is:

$$e_2 = \frac{E_{20} R_{18} R_{52}}{(R_{18}+R_{51}) R_{52}+R_{51} R_{18}} \quad [14]$$

$$e_2 = \frac{A R_{52}}{B R_{52}+C} \quad [15]$$

where A, B and C are constants from Equation 14, where $E_{20}$ is the voltage drop from wiper 19 to ground, and where $R_{18}$, $R_{51}$ and $R_{52}$ are, respectively, the resistances of potentiometer 18, resistor 51 and probe 52. The curve for these equations is plotted in FIG. 5. The curve starts at zero and approaches $A/B$ asymptotically. Upon the selection of a suitable probe resistance, corresponding to voltage regulation along the linear part of the curve, the voltage $e_2$ will be substantially a linear function of probe resistance. Since the material of probe 52 has a linear resistance-temperature coefficient, the foregoing arrangement will provide a voltage $e_2$ continuously regulated as a linear function of liquid temperature.

In FIG. 4a, the volume-temperature compensating means involves a resistor 51a of fixed resistance in series with a temperature sensing probe 52a connected as a voltage divider across the measuring signal side of the bridge. Probe 52a is coupled to the end of the transformer secondary removed from ground and one side of resistor 27 is connected to the common junction of resistor 51a and probe 52a, whereby the voltage applied to resistor 27 is $e_t$, a proportionate part of transformer voltage $e_t$. Probe 52a is a variable resistor constituted by the nickel wire element immersed or otherwise supported at the bottom of tank 40, see FIG. 3 so that at all times during bridge operation probe 52a is positioned to sense the temperature of liquid 10. Nickel probe 52a is supported in the system in the same manner as described with respect to FIG. 4.

The voltage $e_t$ applied to measuring resistor 27 as determined by the compensating voltage divider network may be expressed as follows:

$$e_t = \frac{e_1 R_{51a}}{R_{51a}+R_{52a}} \quad [14a]$$

$$e_t = \frac{A}{B+R_{52a}} \quad [15a]$$

where A and B are constants from Equation 14a, $e_1$ is the secondary transformer voltage and $R_{51a}$ and $R_{52a}$ are, respectively, the resistances of resistor 51a and probe 52a. The curve for these equations is depicted in FIG. 5a. Upon the selection of a suitable probe resistance corresponding to voltage regulation of $e_t$ along the linear part of the curve, this voltage will be substantially a linear function of probe resistance. Since the material of probe 52a has a linear resistance-temperature coefficient, the foregoing arrangement will provide a voltage $e_t$ continuously regulated in a proper direction as a linear function of liquid temperature. For example, an increase of liquid temperature will cause an increase in liquid level in the measuring tank which will normally result in a corresponding increase in measuring current $I_t$. However, the same rise in liquid temperature will also raise the resistance $R_{52a}$ which lowers voltage $e_t$ to prevent the spurious rise of bridge current $I_t$ as wiper 23 remains fixed. A drop in liquid temperature is compensated by a correlated drop in the voltage across probe 52a and rise in $e_t$.

For the compensating circuit shown in FIG. 4, the resistances for resistor 51 and probe 52 are selected to provide a desired regulation of $e_2$ in accordance with the coefficient of volumetric expansion of liquid 10. The relative values for resistances $R_{51}$, $R_{52}$ are determined by the voltage desired across potentiometer 18 with respect to ground, the temperature coefficient properties of the materials constituting liquid 10 and probe 52, and Equation 14. For example, in gaging Skydrol; the liquid was found to vary 14% in volume for a range of $-54°$ C. to $107°$ C., and that the resistance of the nickel probe 52 varied 112% over this range. accordingly, a 14% change of voltage $e_2$ is desired across probe 52 which changes 112% in resistance. For a desired value of 40 volts across potentiometer 18 at a reference temperature of $20°$ C., a resistance of 2160 ohms was determined for probe 52 and 510 ohms for resistor 51. The actual resistances used in the illustrated embodiment of gage 15 are 3000 ohms for probe 52 and 440 ohms for resistor 51. Since the resistance of resistor 51 should be constant, resistor 51 is constituted by material having a temperature coefficient of resistance in the order of 20 parts per million with a tolerance of ±1%. The resistance of probe 52 may be obtained by suitably selecting the physical dimensions of a wire-like filament of nickel supported in tank 40.

The circuit of FIG. 4 operates as follows. When a given mass of liquid 10 expands due to a temperature increase, bridge current $I_t$ will increase proportionately and this would normally be balanced by wiper 23 moving up potentiometer 18 to balance the bridge. However, wiper 23 position now remains unchanged because the foregoing compensating means has increased voltage $e_2$ a proper proportion to raise the wiper voltage $ae_2$ whereby bridge balance is maintained. The temperature compensation provided by the foregoing circuit is linearly proportional to the position of wiper 23. For an empty container 11, wiper 23 will be at ground position and any temperature change affecting $e_2$ will not move wiper 23 from ground; hence, at any up scale position, the amount of compensation will be exactly proportional thereto. In accordance with the above analysis, transformer 16 is selected to have a low output impedance to avoid variations of the transformer voltage due to loading.

FIG. 6 illustrates the preferred embodiment of tank unit 40 coupled into conductance gage 15. Tank unit 40 combines the three sets of electrodes constituting resistors 24, 27 and 37 and the temperature sensing probe 52 in a unitary structure. Tank unit 40 involves the outer hollow tubular member 42 made of aluminum. The inner diameter surface of tube 42 defines one electrode of measuring tank resistor 27. An outer sleeve 53 of conducting material is fastened by rivets 54 (only one of which is shown) to the upper end of tube 42. A flange assembly 55 is retained to sleeve 53 by bolts 56. Flange assembly 55 is adapted to register over an opening in a top wall portion of container 11 and is fastened thereto to support tank unit 40 vertically in container 11. It will be understood that at the region of insertion of tank unit 40 into container 11, that container 11 is suitably pressure sealed against leakage in accordance with the current practices of the art. The top of flange assembly 55 is enclosed by a cover assembly 57 which includes a connector receptacle 58 at its top. Receptacle 58 has cable terminals for conducting wires for coupling resistors 24, 27, 37 and 52 to the external components of the bridge circuit. Cover assembly 57 is retained in assembled position by suitable locking means including a retaining ring 59. Ring 59 peripherally registers in a recess 60 of flange assembly 55 and clamps against cover 57. An O ring 61 is carried by an undercut portion of cover 57 and presses against an interior wall of flange 55 to seal tank unit 40. The lower end of member 42 is completed by a compensating and sleeve assembly including a tube 62 of non-conducting material fastened by rivets about the outer lower end of member 42. The aforesaid assembly includes the hollow tubular member 43 made of aluminum. Member 43 is coaxially supported within sleeve 62 below the bottom of tube 42 by rivets 63 whereby the adjacent upper and lower ends of tubes 42, 43 in a horizontal plane are closely spaced apart. Spacers 63a are mounted on rivets 63 to maintain tube 43 in desired coaxial position. An externally mounted open end cap 64 of nonconducting material and the interiorly mounted hollow tubular member 50 of aluminum are retained at the bottom of the compensator assembly by rivets 65 (only one of which is shown).

An inner tube assembly includes the axially long hollow tubular member 41 of aluminum. An adapter 66 of conducting material is fastened into the top end of member 41. Adapter 66 passes through a central through opening in an interior wall portion 67 of flange assembly 55. The top end of adapter 66 projecting above flange wall 67 is threaded at 68. The lower end of tube 41 is closed off by a base 69. A pair of suitably insulated conductive terminal components 70, 71 are embedded in base 69. The inner tube assembly is retained in coaxial relationship within the previously described outer tube assembly by having the bottom end of tube 41 register within a suitably shaped interior wall of end cap 64 as adapter 66 registers with the suitably shaped through opening in flange assembly wall 67. The terminal pins of terminal components 70, 71 pass through end cap 64 and are adapted to receive terminal nuts 70a, 71a. A hollow core 72 of nonconducting material is supported at the lower portion of member 41 and against its inner diameter wall. A hollow spacer 73 of non-conducting material determines the desired position for core 72 at bottom of tube 41. The temperature sensing probe 52 is constituted by a ribbon-like wire of nickel provided with a protective non-conductive wrap. Wire 52 is wrapped around core 72 and wedged between the contiguous bodies 41, 72. Two wires 74, 75 are conductively connected to individual ends of resistance wire 52. Wires 74, 75 extend upwardly through member 41, adapter 66 and connect to respective terminals of receptacle 58, which terminals are connected respectively to ground and to the junction of resistor 51 and potentiometer 18 by external cable wires 74a, 75a. In the illustrated embodiment of FIG. 6, the temperature sensing network is that shown in FIG. 4. However, it should be understood that tank unit 40 is equally adaptable to provide the sensing network of FIG. 4a.

Two strips of conducting material 76, 77 are soldered to respective electrodes 43, 50, pass through end cap 64, are turned and connect to respective terminals 70, 71. Two wires 78, 79 are connected to terminals 70, 71, respectively, and extend upwardly through tubular member 41 and adapter 66 to couple with respective receptacle terminals. External cable wires 78a, 79a couple electrodes 43, 50 to wiper 23 and one side of amplifier output 36, respectively. The interior of tube 41 is filled with a lock foam potting compound, and the top of adapter 66 is enclosed with sealing material 80 through which wires 74, 75, 78, 79 pass.

One of the bolts 56 is conductively connected to a respective terminal of receptacle 58 by wire 81. An external cable wire 81a conductively connects the aforesaid receptacle terminal to the high potential side of transformer 16 below ground. This voltage is coupled to the electrode of measuring tank resistor 27 constituted by the inner diameter of tube 42. The circuit is completed by the aforesaid bolt 56 which makes good electrical connection to sleeve 53, and from sleeve 53 to rivets 54. The inner ends of rivets 54 are in good electrical connection with tube 42.

A conducting tab 82 is held on the top end of adapter 66 by a nut 83. The upper end of tube 41 is received in an annular recess 84 of the adapter wherein tube 41 may be soldered to adapter 66. The electrode constituted by tube 41 is the common junction 49 (FIG. 1) of the bridge. This common electrode is conductively coupled to tab 82 through conductive adapter 66. The circuit from junction 49 to the high potential side of amplifier input 25 is completed by a wire 85 connected to a terminal of receptacle 58 and by an external cable wire 85a connected to said terminal. Since the illustrated flange assembly 55 is made of conducting material, suitably non-conducting and pressure sealing material 86, electrically isolates same from adjacent parts of tank unit 40. Flange 55 may be grounded and is so shown.

Tube 42 is provided with openings 44 to permit a free flow of liquid 10 into space 45 and into the concentric spaces 46 and 87 in the compensating portion of tank unit 40. Once liquid 10 fills the concentric spaces between tube 41 and sleeve 62 of the compensating assembly below the lower edge of tube 42, this portion of tank unit 40 remains filled and is not affected by changes of liquid level in container 11, whereas the level of liquid in space 45 will always be the same as the level of liquid in container 11. Moreover, although the nickel wire 52 is not actually immersed in liquid 10, its position is such that it is always capable of sensing the temperature of liquid 10 regardless of the height of the liquid in space 45.

As noted hereinbefore, it would be advantageous to profile one of the electrodes constituting measuring resistor 27 to provide a signal response exhibiting a height vs. volume relationship duplicating that of liquid 10 in container 11. The conductive outer diameter surface of member 41 may be the profiled electrode and may be effected by masking this surface with a predetermined profiled mask. With respect to the embodiment of tank unit 40 shown in FIG. 6, it will be understood that the active areas of electrodes 41, 42 constituting resistor 27 are defined by the confronting portions of the outer and inner surfaces, respectively, of such electrodes; the active areas of electrodes 41, 43 constituting resistor 24 are the confronting portions of the outer and inner surfaces, respectively, of said electrodes; and the active areas of electrodes 41, 50 constituting the feedback resistor are defined by the confronting portions of the outer and inner surfaces, respectively, of said electrodes.

It is intended that all matter contained in the above description or shown in the accompanying drawings shall be interpreted as illustrative and not in a limiting sense.

What is claimed is:

1. A gage for measuring a liquid material characterized by a negative resistance-temperature coefficient in a container comprising, a rebalancing bridge providing first and second voltage sources of opposite instantaneous polarity with respect to ground, first conductance means coupled to a first of said bridge sources and defining a current path for a first bridge current, the conductance of said means being a function of liquid conductivity and the amount of liquid in said container, a rebalancing potentiometer coupled to the second of said sources and having a movable wiper adapted to provide a wiper voltage with respect to ground corresponding to a proportionate part of said second voltage, second conductance means coupled to said wiper for defining a current path for a second bridge current proportional to said wiper voltage, the conductance of said second means being a function of liquid conductivity, comparison means for providing a bridge balancing signal corresponding to a difference signal between said first and second bridge currents, means responsive substantially to the real component of said bridge balancing signal for repositioning said wiper in a direction to vary wiper voltage and alter said second bridge current to reduce said difference signal to zero, and means having maximum effectiveness for damping wiper hunting about the balance point for bridge operation at relatively high liquid temperatures as said bridge returns to said balance point in response to a bridge balancing signal, said damping means having minimum effect for bridge operation at relatively low liquid temperatures.

2. A gage for measuring a liquid-like material in a container comprising, a rebalancing bridge providing first and second voltage sources of opposite instantaneous polarity with respect to ground, first conductance means coupled to a first of said bridge sources and defining a current path for a first bridge current, a rebalancing potentiometer coupled to the second of said sources and having a movable wiper adapted to provide a wiper voltage with respect to ground corresponding to a proportionate part of said second voltage, a second conductance means coupled to said wiper for defining a current path for a second bridge current proportional to said wiper voltage, said first and second conductance means being defined by a unitary tank unit having an inner tubular member with a conductive outer surface, and first and second axially spaced apart outer tubular members supported coaxially about said inner member, at least one tubular surface of said outer members being conductive, the conductive surfaces of said inner member and said first outer member being operatively associated to define the electrodes of said first conductance means, said tank unit being supported vertically in said container, said second outer member being operatively associated with the lower portion of said inner member and the conductive surfaces thereof defining the electrodes of said second conductance means, said first outer tubular member having openings along its length to permit the free flow of liquid between the electrodes of said first conductance means so that the level of liquid between such electrodes is equal to the liquid level in said container and wherein the active areas of the electrodes constituting the second conductance means are always immersed in the liquid, comparison means for providing a bridge balancing signal corresponding to a difference signal between said first and second bridge currents, and means responsive substantially to the real component of said bridge balancing signal for repositioning said wiper in a direction to vary wiper voltage and alter said second bridge current to rebalance the bridge.

3. A gage for measuring a liquid having a resistance-temperature characteristic other than zero in a container comprising, a rebalancing bridge providing first and second voltage sources of opposite instantaneous polarity with respect to ground, first conductance means coupled to a first of said bridge sources and defining a current path for a first bridge current, the conductance of said means being a function of liquid conductivity and the amount of liquid in said container, a rebalancing potentiometer coupled to the second of said sources and having a movable wiper adapted to provide a wiper voltage with respect to ground corresponding to a proportionate part of said second voltage, second conductance means coupled to said wiper for defining a current path for a second bridge current proportional to said wiper voltage, the conductance of said second means being a function of liquid conductivity, comparison means for providing a bridge balancing signal corresponding to a difference signal between said first and second bridge currents, said comparison means having an input for receiving said difference signal and an output for providing said bridge balancing signal, means characterized by a resistance-temperature coefficient similar to said liquid and coupled between said output and said input for providing a negative feedback signal from said output and to said input, said last mentioned means being disposed so as to be maintained at the same temperature as said liquid whereby said difference signal caused by bridge unbalance and received by said input is selectively damped as a function of temperature to maintain the sensitivity of the gauge substantially constant over a wide range of temperature variation, and means responsive substantially to the real component of said bridge balancing signal for repositioning said wiper in a direction to vary wiper voltage and alter said second bridge current to rebalance the bridge.

4. A gauge as defined in claim 3, wherein said feedback means comprises, a set of spaced electrodes extending into said container, said electrodes being fully immersed in said liquid during the bridge measurement operation and each having at least a portion of its surface free from dielectric material, whereby the conductance of said feedback means is a function of liquid conductivity.

5. A gauge as defined in claim 3 wherein said first and second conductance means and said feedback means are defined by a unitary tank unit comprising, an inner tubular member having a conductive outer surface, and first, second and third axially spaced apart outer tubular members supported coaxially about said inner member, at least one tubular surface of said outer members being conductive, the conductive surfaces of said inner member and said first outer member being operatively associated to define the electrodes of said first conductance means, said tank unit being supported vertically in said container, said second outer member being operatively associated with a lower portion of said inner member and the conductive surfaces thereof defining the electrodes of said second conductance means, said third outer member being operatively associated with a lower portion of said inner member and the conductive surfaces thereof defining said feedback means, said first outer tubular member having openings along its length to permit the free flow of liquid between the electrodes of said first conductance means, so that the level of liquid between such electrodes is equal to the liquid level in said container and wherein the active areas of the electrodes constituting said second conductance means and said feedback means are always immersed in the liquid.

6. A gage for measuring a liquid-like material in a container, which liquid is characterized by a negative resistance-temperature coefficient, comprising, an alternating current rebalancing bridge providing first and second relatively low frequency voltage sources of opposite instantaneous polarity with respect to ground, a first set of spaced electrodes extending into said container and defining first conductance means adapted to receive a level of liquid between its electrodes substantially equal to the height of liquid in said container, said means being coupled to a first of said bridge sources and having a conductance which is a function of liquid conductivity and the amount of liquid in said container, said means defining a current path for a first bridge current, a rebalancing potentiometer coupled to the second of said sources and having a movable wiper adapted to provide a wiper voltage with respect to ground corresponding to a proportionate part of said second voltage, a second set of spaced electrodes extending into said container and providing second conductance means coupled to said wiper for defining a current path for a second bridge current proportional to said wiper voltage, said second set of electrodes being fully immersed in said liquid during a measuring operation of said bridge so that the conductance of said second means is a function of liquid conductivity, a signal amplifier having an input for receiving said bridge currents and having an output providing a bridge balancing signal corresponding to a difference signal between said first and second bridge currents, means responsive substantially only to the real component of said bridge balancing signal for repositioning said wiper in a direction to vary wiper voltage such that said second bridge current is varied to balance changes of said first bridge current due to incremental changes of liquid level in said container, and means providing a negative feedback signal to said amplifier input proportional to said bridge balancing signal and comprising, an additional set of spaced electrodes extending into said container and providing a feedback current path from said amplifier output to said amplifier input, said feedback electrodes being fully immersed in said liquid during a bridge measuring operation and each having at least a portion of its surface free from dielectric material, the conductance of said feedback electrodes being a function of liquid conductivity, whereby said difference signal caused by bridge unbalance is selectively damped as a function of liquid conductivity to maintain the sensitivity of the gage substantially constant over a wide range of variation in liquid conductivity.

7. In a rebalancing bridge for volumetric gaging a liquid in a container of the type wherein said bridge provides first and second voltage sources of opposite instantaneous polarity with respect to ground, bridge balance is responsive to a bridge balancing signal corresponding to a difference signal between a plurality of bridge currents, a first of said bridge currents is a function of the volumetric proportional part of the container filled with the liquid and a first of said voltage sources, and a second of said currents is a function of a second of said voltage sources; apparatus compensating for volumetric changes of the liquid in said container due to liquid temperature variations comprising, a rebalancing potentiometer coupled to the second of said sources and having a movable wiper adapted to provide a wiper voltage with respect to ground corresponding to a proportionate part of said second voltage, a current conducting sensor characterized by a positive and substantially linear resistance-temperature coefficient for sensing the liquid temperature, and a resistor having one end coupled to the high potential side of said second source, said sensor being conductively coupled in shunt relationship across said potentiometer with respect to ground, the junction of said potentiometer and sensor removed from ground being coupled to the other end of said resistor in series conductive relationship therewith, a change of sensor resistance due to a liquid temperature variation effecting a relatively linear and correlated change of voltage drop across said potentiometer, whereby a change in said first current due to such temperature variation is balanced by current changes caused by the correlated change of wiper voltage without requiring a readjustment of said wiper.

8. A gage for measuring a liquid-like material in a container, which liquid exhibits electrical conducting characteristics, comprising, an alternating current rebalancing bridge providing first and second voltage sources of opposite instantaneous polarity with respect to ground, first conductance means coupled to a first of said bridge sources and defining a current path for a first bridge current, the conductance of said means being a function of liquid conductivity and the amount of liquid in said container, a rebalancing potentiometer coupled to the second of said sources and having a movable wiper adapted to provide a wiper voltage with respect to ground corresponding to a proportionate part of said second voltage, second conductance means coupled to said wiper for defining a current path for a second bridge current proportional to said wiper voltage, the conductance of said second means being a function of liquid conductivity, comparison means for providing a bridge balancing signal corresponding to a difference signal between said bridge currents, means responsive substantially only to the real component of said bridge balancing signal for repositioning said wiper in a direction to vary wiper voltage such that said second bridge current changes to rebalance the bridge, a current conducting sensor characterized by a positive and substantially linear resistance-temperature coefficient, said sensor extending into said container for sensing the liquid temperature, and a resistor having one end coupled to the high potential side of said second source, said sensor being conductively coupled in shunt relationship across said potentiometer with respect to ground, the junction of said potentiometer and sensor removed from ground being coupled to the other end of said resistor in series conductive relationship therewith, a change of sensor resistance due to a liquid temperature variation effecting relatively linear and correlated change of voltage drop across said potentiometer, whereby a change in said first current due to such liquid temperature variation is balanced by current changes caused by the correlated change of wiper voltage without requiring a readjustment of said wiper.

9. A gage for measuring a liquid-like material in a container, which liquid is characterized by a negative resistance-temperature coefficient, comprising, an alternating current rebalancing bridge providing first and second relatively low frequency voltage sources of opposite instantaneous polarity with respect to ground, a first set of spaced electrodes extending into said container and defining first conductance means adapted to receive a level of liquid between its electrodes substantially equal to the height of liquid in said container, said means being coupled to a first of said bridge sources and having a conductance which is a function of liquid conductivity and the amount of liquid in said container, said means defining a current path for a first bridge current, a rebalancing potentiometer coupled to the second of said sources and having a movable wiper adapted to provide a wiper voltage with respect to ground corresponding to a proportionate part of said second voltage, a second set of spaced electrodes extending into said container and providing second conductance means coupled to said wiper for defining a current path for a second bridge current proportional to said wiper voltage, said second set of electrodes being fully immersed in said liquid during a measuring operation of said bridge such that the conductance of said second means is a function of liquid conductivity, a signal amplifier having an input for receiving said bridge currents and having an output providing a bridge balancing signal corresponding to a difference signal between said first and second bridge currents, means responsive substantially only to the real component, said bridge balancing signal for repositioning said wiper in a direction to vary wiper voltage such that said second bridge current is varied to balance changes of said first bridge current due to incremental changes of liquid level in said container, means providing a negative feedback signal to said amplifier input proportional to said bridge balancing signal and comprising, an additional set of spaced electrodes extending into said container and providing a feedback current path from said amplifier output to said amplifier input, said feedback electrodes being fully immersed in said liquid during a bridge measuring operation and each having at least a portion of its surface free from dielectric material such that the conductance of said feedback electrodes is a function of liquid conductivity, the sensitivity of said gage being maintained substantially constant over a wide range of liquid conductivity, a temperature sensing probe constituted substantially of nickel extending into said container for sensing the temperature of said liquid, and a resistor with a substantially fixed resistance having one end coupled to the high potential side of said second source, said sensor being conductively coupled in shunt relationship across said potentiometer with respect to ground, the junction of said potentiometer and sensor removed from ground being coupled to the other end of said resistor in series conductive relationship therewith, the resistances of said probe and said resistor being preselected to cause a relatively linear and correlated change of voltage drop across said potentiometer by reason of a change of probe resistance due to a variation of liquid temperature, whereby a change in said first current due to such liquid temperature variation is balanced by current changes caused by the correlated change of wiper voltage without requiring a readjustment of said wiper.

10. A rebalancing bridge for volumetric gaging a liquid in a container comprising a unitary tank unit having an outer tubular assembly including an outer tubular member having a conductive inner surface, a flange assembly fastened to the upper end of said outer tubular assembly, said flange assembly being adapted for mounting about an opening at the top of said container for supporting said tank unit vertically in said container, a tubular compensator assembly fastened to the outer lower end of said outer member and extending axially below it, said compensator assembly having a pair of hollow axially spaced apart first and second tubular members concentrically supported in the lower interior portion of its assembly, an inner tubular member having a conductive outer surface, said inner member being supported concentrically within said outer member, said first compensator tubular member having an upper end below and in close spaced relationship with the lower end of said outer tubular member, said second compensator tubular member being further removed from said outer tubular member, said first and second tubular members having conductive surfaces, a conducting wire element supported in the interior of the inner member and at the lower portion thereof surrounded by said compensator assembly, said element constituting a temperature sensing means, and bridge components external of said tank unit conductively coupled to said element and the conductive surfaces of said tubular members to form a rebalancing bridge, the conductive surfaces of said inner member and said outer member being operatively associated to define electrodes of a first conductance means, the conductive surfaces of said first compensator member and said inner member defining electrodes of a second conductance means, the conductive surfaces of said second compensator member and inner member defining feedback means, said first outer tubular member having openings along its length to permit the free flow of liquid between the active areas of the electrodes constituting said first conductance means, the tank unit being disposed in the container so that the level of liquid between the electrodes of the first conductance means gaged from the bottom edge of said outer member is equal to the liquid level in said container, the active areas of the electrodes constituting said second conductance means and said feedback means are always immersed in the liquid, and said element is disposed to sense liquid temperature, said first and second conductance means being coupled for providing respective bridge signals, said feedback means being coupled for regulating the sensitivity of the bridge, and said temperature sensing means being coupled for regulating the signal output from one of said conductance means as a function of liquid temperature.

11. In a rebalancing bridge for volumetric gaging a liquid in a container wherein said bridge provides first and second voltage sources of opposite instantaneous polarity with respect to ground and where bridge balance is responsive to a bridge balancing signal corresponding to a difference between a plurality of bridge currents, apparatus comprising, a first pair of spaced electrodes in said container for receiving a level of liquid between said electrodes equal to the liquid level in said container, said electrodes being coupled to the first source for providing a first bridge current proportional to liquid level and to said first source, a second set of spaced electrodes always immersed in said liquid and coupled to said second source for providing a second bridge current proportional to said second source, a variable resistance temperature sensing probe characterized by a positive and substantially linear resistance-temperature coefficient for sensing liquid temperature, and a fixed resistance resistor coupled to said probe to form a voltage divider, said voltage divider being coupled to one of said voltage sources for regulating the voltage coupled to the particular set of electrodes also coupled thereto, a change of sensor resistance due to liquid temperature variations causes a correlated variation of voltage to which said particular set of electrodes are coupled so that the bridge balancing signal is rendered insensitive to liquid volumetric variations in said container due solely to liquid temperature variations.

12. Apparatus as defined in claim 11, said probe being coupled to the high potential side of said first source and also being in series with said resistor, the first set of said electrodes being coupled to the common junction of said probe and resistor, whereby the voltage coupled to said first set of electrodes is regulated inversely proportional to liquid temperature variations.

13. Apparatus as defined in claim 12, said probe being a nickel element immersed in said container.

References Cited in the file of this patent
UNITED STATES PATENTS

| | | |
|---|---|---|
| 2,213,888 | Ross | Sept. 3, 1940 |
| 2,582,399 | Smith | Jan. 15, 1952 |
| 2,582,400 | Smith | Jan. 15, 1952 |
| 2,683,777 | Anderson | July 13, 1954 |
| 2,710,541 | Miller | June 14, 1955 |
| 2,918,818 | Meyer | Dec. 29, 1956 |
| 2,789,435 | Weiss | Apr. 23, 1957 |
| 2,797,284 | Brooke | June 25, 1957 |
| 2,901,680 | Goldman | Aug. 25, 1959 |
| 2,904,751 | Parsons | Sept. 15, 1959 |
| 2,908,166 | Johnson | Oct. 13, 1959 |

FOREIGN PATENTS

| | | |
|---|---|---|
| 842,554 | Germany | June 30, 1952 |

UNITED STATES PATENT OFFICE
CERTIFICATE OF CORRECTION

Patent No. 3,114,262                                        December 17, 1963

Nathan Atun

It is hereby certified that error appears in the above numbered patent requiring correction and that the said Letters Patent should read as corrected below.

Column 2, line 45, for "temperature" read -- temperatures --; column 5, lines 11 and 12, for "embodiments" read -- embodiment --; column 6, line 56, for "constitutes" read -- constitute --; column 8, line 27, for "eleminates" read -- eliminates --; column 9, line 70, for "$e_t$", in italics, second occurrence, read -- $e_1$ --, in italics; column 10, line 44, for "accordingly" read -- Accordingly --; column 11, line 3, for "prefered" read -- preferred --; column 18, after line 68, insert 2,968,180     Schafer---------- Jan. 17, 1961

Signed and sealed this 4th day of August 1964.

(SEAL)
Attest:

ERNEST W. SWIDER                             EDWARD J. BRENNER
Attesting Officer                               Commissioner of Patents